(12) United States Patent
Maki et al.

(10) Patent No.: US 6,673,472 B2
(45) Date of Patent: *Jan. 6, 2004

(54) RUST PREVENTIVE CARBON STEEL SHEET FOR FUEL TANK HAVING GOOD WELDING GASTIGHTNESS AND ANTICORROSION AFTER FORMING

(75) Inventors: Jun Maki, Kitakyushu (JP); Teruaki Izaki, Kitakyushu (JP); Masahiro Fuda, Kitakyushu (JP); Tetsurou Takeshita, Kitakyushu (JP); Nobyoshi Okada, Kitakyushu (JP); Takayuki Ohmori, Kitakyushu (JP)

(73) Assignee: Nippon Steel Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,558

(22) PCT Filed: Jul. 1, 1997

(86) PCT No.: PCT/JP97/02275

§ 371 (c)(1),
(2), (4) Date: Feb. 26, 1998

(87) PCT Pub. No.: WO98/00573

PCT Pub. Date: Jan. 8, 1998

(65) Prior Publication Data

US 2001/0016268 A1 Aug. 23, 2001

(30) Foreign Application Priority Data

Jul. 1, 1996 (JP) ............................. 8-170795
Dec. 11, 1996 (JP) ............................. 8-330672
Dec. 18, 1996 (JP) ............................. 8-338422

(51) Int. Cl.$^7$ ................... B32B 15/04; B32B 15/18; B32B 15/20; F17C 3/12
(52) U.S. Cl. .................. 428/653; 220/4.14; 428/654; 428/682; 428/684; 428/341; 428/334
(58) Field of Search ................... 428/623, 652, 428/626, 653, 654, 681, 682, 684, 685, 457, 340, 341, 334, 219, 450, 660, 615; 148/328, 333, 320, 242, 516, 523; 220/4.12, 4.14

(56) References Cited

U.S. PATENT DOCUMENTS

| | | | |
|---|---|---|---|
| 4,456,663 A | * 6/1984 | Leonard | ............. 428/653 |
| 4,546,051 A | * 10/1985 | Uchida et al. | ............. 428/653 |
| 4,891,274 A | * 1/1990 | Higuchi et al. | ............. 428/653 |
| 5,308,709 A | * 5/1994 | Ogino et al. | ............. 428/623 |
| 5,478,600 A | * 12/1995 | Takeda et al. | ............. 427/376.8 |
| 5,582,658 A | * 12/1996 | Masui et al. | ............. 148/518 |
| 5,789,089 A | * 8/1998 | Maki et al. | ............. 428/623 |
| 5,853,806 A | * 12/1998 | Higuchi et al. | ............. 427/310 |
| 6,017,643 A | * 1/2000 | Kobayashi et al. | ............. 428/653 |

FOREIGN PATENT DOCUMENTS

| | | |
|---|---|---|
| JP | H6-158221 | 6/1994 |
| JP | H6-306637 | 11/1994 |
| JP | H8-13029 | 1/1996 |
| JP | 8-13029 | 1/1996 |
| JP | 8-277453 | * 10/1996 |
| JP | 9-41044 | 2/1997 |
| JP | 9-53166 | 2/1997 |

OTHER PUBLICATIONS

Patent Abstracts of Japan; vol. 009, No. 247 (C–307), Oct. 3, 1985 & JP 60–103167 A (Shin Nippon Seitetsu KK), Jun. 7, 1985.
Patent Abstracts of Japan, vol. 010, No. 004 (C–322), Jan. 9, 1986 & JP 60–165366 A (Shin Nippon Seitetsu KK), Aug. 28, 1985.

* cited by examiner

Primary Examiner—Michael La Villa
(74) Attorney, Agent, or Firm—Kenyon & Kenyon

(57) ABSTRACT

The present invention provides a hot-dip Al-plated steel sheet for fuel tanks excellent in air-tightness after welding and corrosion resistance subsequent to forming. The present invention provides, as concrete means, a hot-dip Al-plated steel sheet comprising a steel sheet comprising up to 0.003% of C, up to 0.03% of Si, up to 0.3% of Mn, up to 0.02% of P, up to 0.006% of N, up to 0.1% of Ti, Ti and Nb in a total amount of at least the atomic equivalent of (C+N) and up to 0.2%, 1 to 30 ppm of B, and the balance Fe and unavoidable impurities, and a plating layer comprising 2 to 13% of Si, and the balance Al and unavoidable impurities on the surface of the steel sheet, the steel sheet showing a total elongation of at least 45% after plating. Alternately, the hot-dip Al-plated steel sheet may have a chromate coating in an amount of 5 to 100 mg/m$^2$ on the surface, and it may also have a resin coating on the top surface. As a result, the Al-plated steel sheet is excellent in elongation after Al plating. The Al-plated steel sheet is, therefore, significantly excellent in corrosion resistance subsequent to forming in the internal environment of fuel tanks compared with conventional steel sheets. Accordingly, the Al-plated steel sheet also having excellent air-tightness after welding is most appropriate as a material for fuel tanks of automobiles.

21 Claims, No Drawings

RUST PREVENTIVE CARBON STEEL SHEET FOR FUEL TANK HAVING GOOD WELDING GASTIGHTNESS AND ANTICORROSION AFTER FORMING

FIELD OF THE INVENTION

The present invention provides a rust-preventive steel sheet, having corrosion resistance as well as excellent air-tightness after welding, as a steel sheet for automobile fuel tanks.

BACKGROUND OF THE INVENTION

A fuel tank of an automobile is usually designed in accordance with the design of the body in the final stage, and the shape has tended to become more and more complicated in recent years. Moreover, since the fuel tank must be safe in an automobile, the material to be used for the fuel tank is required to have an extremely excellent deep drawability and not to crack, due to an impact, subsequent to forming. In addition to the requirements, it is also important that the material form a decreased amount of corrosion product leading to pitting corrosion and filter clogging, and that the material can be easily and stably welded.

A Pb—Sn alloy-plated steel sheet, which is called a terne steel sheet, (Kokoku (Japanese Examined Patent Publication) No. 57-61833) has heretofore been principally used as a material having such various properties. The steel sheet has chemical properties stabilized against gasoline, and shows excellent press formability due to the excellent lubricity of the plating. In addition to the Pb—Sn alloy-plated steel sheet, a Zn-plated steel sheet which is thickly chromated is also used. The steel sheet also has excellent formability and corrosion resistance though it is not as excellent as the Pb—Sn alloy-plated steel sheet. However, a material not using Pb is desired from the standpoint of decreasing environmental pollution.

One of the prospective fuel tank materials of automobiles in which Pb is not used is an Al—(Al—Si) plated steel sheet. Since Al forms a stabilized oxidized film on its surface, Al shows excellent resistance to corrosion caused by organic acids formed by the deterioration of alcohol, gasoline, etc. as well as to gasoline. However, there are several problems with using the Al-plated steel sheet as a fuel tank material. One of the problems is poor press formability. Since the Al-plated steel sheet has a very hard Fe—Al—Si intermetallic compound layer (referred to as an alloy layer hereinafter) formed at the interface between the plating layer and the steel sheet, the material quality is lowered compared with that of a steel sheet having no Al-plated layer. The Al-plated steel sheet, therefore, tends to crack when severely formed.

The Al-plated steel sheet also has the disadvantage that the peeling of the plating and crack formation therein tend to take place from a starting point in the alloy layer. When cracks are formed in the plating, inner corrosion tends to proceed from the cracks, and pitting may result in a short period of time. Accordingly, corrosion resistance subsequent to forming is a serious problem.

Another problem is weldability. Although an Al-plated steel sheet may be resistance welded, the welding lacks stability to some degree. Moreover, the Al-plated steel sheet has a problem in that the weld zone shows poor air-tightness though the steel sheet may be subjected to resistance welding such as spot welding and seam welding. Although a fuel tank material is required to have air-tightness after welding so that the fuel neither leaks nor volatilizes, the Al-plated steel sheet has the problem that its weld zone tends to fracture when an internal pressure is applied after welding, and the steel sheet shows poor air-tightness after welding. This is a phenomenon which substantially does not take place in other plated steel sheets such as a terne steel sheet and a Zn-plated steel sheet but which appears significant in the Al-plated steel sheets alone. Though the reasons are not definite, it is thought that Al in the plating layer diffuses into the steel to exert undesirable effects.

DISCLOSURE OF THE INVENTION

The present invention solves the problems as mentioned above, and provides a new rust-preventive steel sheet for fuel tanks having excellent corrosion resistance without using Pb in an organic acid environment and excellent press formability with which the steel sheet may satisfy anticipated sever press conditions in the production process of the tanks, showing no poor air-tightness in the weld zone, and ensuring resistance to corrosion caused by an organic acid after forming.

Furthermore, the chemical composition of the steel is optimized in the present invention to ensure the air-tightness in the weld zone. Specifically, the properties of the steel sheet has been significantly improved by restricting the P content and adding B.

The present applicant has disclosed a hot-dip Al-plated steel sheet to which up to 30 ppm of B is added in Kokai (Japanese Unexamined Patent Publication) No. 60-165366, and a hot-dip Al-plated steel sheet to which 0.01% of B is added in Kokai (Japanese Unexamined Patent Publication) No. 60-103167. These inventions have intended to provide steel sheets having a high temperature strength or oxidation resistance at high temperatures, and B has been added to fulfill the object. Moreover, the steel sheets are naturally anticipated to be used for automobile exhaust system materials, etc. to be employed in a high temperature environment. In contrast to the inventions mentioned above, the present inventor has discovered that the optimization of the contents of P and B in the steel has significant effects on the improvement of the air-tightness after welding which is an essential property of fuel tank materials.

On the other hand, the present invention provides two methods for greatly improving the corrosion resistance of a steel sheet subsequent to forming, namely the other problem to be solved.

First, the present inventors have investigated the progress of corrosion in fuel tanks subsequent to forming, and found a corrosion behavior as described below. A principal corrosion component in the inner environment of fuel tanks is formic acid formed by decomposition of the fuel. Corrosion of the base steel begins from cracks in the plating and the alloy layer as starting points, and the corrosion proceeds at the interface between the base steel and the alloy layer, resulting in gradual floating of the plating from the base steel and entire corrosion. The corrosion proceeds at the interface between the base steel and the alloy layer because the potential of the alloy layer is nobler than that of the base steel in the presence of formic acid and consequently corrosion of the base steel near the alloy layer is promoted.

There are two methods for diminishing the corrosion based on such discoveries. One of the methods is to inhibit cracks in the alloy layer, and the other is to decrease the potential difference between the alloy layer and the base steel.

Accordingly, the present invention provides two methods as described below. One is based on the discovery that an Al-plated steel sheet having a high total elongation inhibits crack formation in the plating, and intends to inhibit the formation of cracks in the alloy layer by optimizing the chemical composition of the steel. The other one is based on the discovery that when the potential difference between the alloy layer and the base steel measured in an environment containing 100 ppm of formic acid and the balance water at 20° C. is up to 0.35V, corrosion hardly proceeds, and tends to inhibit the progress of corrosion even when cracks are formed in the alloy layer by optimizing the chemical compositions of the steel and the plating. The potential of the alloy layer-base steel can be controlled by adjusting the chemical compositions of the steel and the plating bath, or by pre-plating before hot-dip plating. For example, the following procedures may be practiced: Cr is added to the steel; the steel surface is pre-plated with Cr; or a clad steel is used; and Zn, etc., is added to the plating bath.

That is, the aspects of the present invention are as described below.

(1) A rust-preventive steel sheet for fuel tanks excellent in air-tightness after welding and corrosion resistance subsequent to forming, which comprises
  a steel sheet comprising, in terms of % by weight, up to 0.01% of C, up to 0.2% of Si, less than 0.6% of Mn, up to 0.04% of P, up to 0.1% of soluble Al, up to 0.01% of N, one or at least two of Ti and Nb in a total amount of at least the atomic equivalent of (C+N) and up to 0.2%, 0.0001 to 0.0030% of B, and the balance Fe and unavoidable impurities, and
  a plating layer comprising 2 to 13% of Si in terms of % by weight, and the balance Al and unavoidable impurities on the surface of the steel sheet.

(2) A rust-preventive steel sheet for fuel tanks excellent in air-tightness after welding and corrosion resistance subsequent to forming, which comprises
  a steel sheet comprising, in terms of % by weight, up to 0.01% of C, up to 0.2% of Si, less than 0.6% of Mn, up to 0.04% of P, up to 0.1% of soluble Al, up to 0.01% of N, one or at least two of Ti and Nb in a total amount of at least the atomic equivalent of (C+N) and up to 0.2%, 0.0003 to 0.0030% of B, and the balance Fe and unavoidable impurities, and
  a plating layer comprising 2 to 13% of Si in terms of % by weight, and the balance Al and unavoidable impurities on the surface of the steel sheet.

(3) A rust-preventive steel sheet for fuel tanks excellent in air-tightness after welding and corrosion resistance subsequent to forming, which comprises
  a steel sheet comprising, in terms of % by weight, up to 0.003% of C, up to 0.1% of Si, up to 0.4% of Mn, up to 0.02% of P, up to 0.1% of soluble Al, up to 0.01% of N, at least one of Ti and Nb in a total amount of at least the atomic equivalent of (C+N) and up to 0.2%, 0.0003 to 0.0030% of B, and the balance Fe and unavoidable impurities, and
  a plating layer comprising 2 to 13% of Si in terms of % by weight, and the balance Al and unavoidable impurities on the surface of the steel sheet.

(4) A rust-preventive steel sheet for fuel tanks excellent in air-tightness after welding and corrosion resistance subsequent to forming, which comprises
  a steel sheet comprising, in terms of % by weight, up to 0.003% of C, up to 0.03% of Si, up to 0.3% of Mn, up to 0.02% of P, up to 0.006% of soluble N, up to 0.1% of Ti, and the balance Fe and unavoidable impurities, and
  a plating layer comprising 2 to 13% of Si in terms of % by weight, and the balance Al and unavoidable impurities on the surface of the steel sheet,
  the steel sheet showing a total elongation of at least 45% after plating.

(5) The rust-preventive steel sheet for fuel tanks excellent in air-tightness after welding corrosion resistance subsequent to forming according to any one of (1) to (4), wherein the steel sheet comprises at least one element selected from the following group in the following amounts: 0.5 to 7% of Cr, 0.05 to 0.5% of Cu, 0.05 to 0.5% of Ni and 0.05 to 0.5% of Mo.

(6) The rust-preventive steel sheet for fuel tanks excellent in air-tightness after welding and corrosion resistance subsequent to forming according to any one of (1) to (5), wherein the amount of the Al plating layer is up to 50 g/m$^2$ per side.

(7) A rust-preventive steel sheet for fuel tanks excellent in air-tightness after welding and corrosion resistance subsequent to forming, which comprises a steel sheet substrate for plating, an Al—Fe—Si intermetallic compound layer thereon and a plating layer comprising Al and unavoidable impurities on the intermetallic compound layer, the difference between the immersion potential of the steel sheet substrate for plating and that of the intermetallic compound layer in a solution comprising 100 ppm of formic acid and the balance water and unavoidable impurities being up to 0.35 V.

(8) The rust-preventive steel sheet for fuel tanks excellent in air-tightness after welding and corrosion resistance subsequent to forming according to (7), wherein the Al—Si plating layer comprises 2 to 13% of Si, 0.5 to 5% in total of one or at least two elements selected from the group consisting of Sn, Zn, Sb and Bi, and the balance Al and unavoidable impurities.

(9) The rust-preventive steel sheet for fuel tanks excellent in air-tightness after welding and corrosion resistance subsequent to forming according to any one of (1) to (8), wherein the rust-preventive steel sheet comprises a chromate coating layer in an amount of 5 to 100 mg/m$^2$ as Cr per side at least on one side of the Al plating layer.

(10) The rust-preventive steel sheet for fuel tanks excellent in air-tightness after welding and corrosion resistance subsequent to forming according to any one of (1) to (9), wherein the rust-preventive steel sheet comprises an organic resin coating layer on the top surface at least on one side thereof.

EMBODIMENTS OF THE INVENTION

The present invention will be explained in detail. First, reasons for restricting the chemical composition of the steel will be explained.

C: In the present invention, the steel sheet must have such a good deep drawability that the steel sheet can be formed to have a complicated shape, for example, the shape of a fuel tank. In order to achieve the object, the steel sheet is preferred to have a C content as low as possible. Moreover, since the quality of the steel sheet is deteriorated by Al plating, the steel sheet is required to have a still lower C content. Since a predetermined formability cannot be obtained when the C content exceeds 0.01%, the upper limit of the C content is determined to be the above-mentioned value. However, when the shape of fuel tanks which will become more and more complicated in the future is considered, the C content is preferably up to 0.003%, more preferably up to 0.0018%.

Si: Si has strong affinity with oxygen, and tends to form a stabilized oxidized film on the Al plating surface in the hot-dip Al plating step. When the oxidized film is formed, the oxidized film hinders an Al-Fe reaction in the plating bath. As a result, a defect called a plateless portion tends to be formed during Al plating. Moreover, since Si is also an element which hardens a steel sheet, the Si content of the steel sheet in the present invention which is required to have a high formability is preferably as low as up to 0.2%, more preferably up to 0.1%, still more preferably up to 0.03%.

Mn: Although Mn is an element effective in highly strengthening a steel sheet, the present invention is intended to provide a mild steel sheet. The steel sheet is, therefore, preferred to have a lower Mn content. Since the steel is hardened so that the production of a steel sheet having a high ductility becomes difficult when the Mn content exceeds 0.6%, the Mn content is determined to be less than 0.6%, preferably less than 0.4%, more preferably less than 0.3%.

P: P is an element which segregates at grain boundaries to embrittle the grain boundaries, and it is also an element which lowers the ductility of a steel sheet. Accordingly, a lower P content is preferred. Moreover, P markedly influences the air-tightness after welding for reasons which are not understood, and greatly deteriorates the air-tightness after welding of a steel sheet to which even B is added when P is added in an amount exceeding 0.04%. Accordingly, the P content is restricted to up to 0.04% in the present invention. In order to obtain the air-tightness after welding more stably, the P content is preferably up to 0.02%, more preferably up to 0.01%.

N: A lower N content is preferred for reasons as mentioned in the C content. From the standpoint of ensuring the formability, the upper limit of the N content is determined to be 0.01%, preferably up to 0.006%.

Ti, Nb: The elements are known to fix C and N. A steel sheet which substantially contains neither solute C nor solute N as a result of fixing C and N with the elements is known as an IF steel. Such an IF steel is naturally mild, and excellent in deep drawability. Ti is added for the purpose as mentioned above also in the present invention. The addition amount is preferably at least the atomic equivalent of (C+N). However, when the contents of C and N are very small, the Ti content may be the magnitude of the content of impurities. Accordingly, the lower limit is not determined specifically. When the addition amount is excessive, the effect is saturated. Moreover, since Ti is an element which promotes an Al—Fe reaction, the alloy layer is likely to become thick when the content is large, and tends to lower the formability of the steel sheet. The upper limit is, therefore, determined to be 0.2%. Since Nb is an element which raises the recrystallization temperature, Ti is preferred to be used in combination.

Al: Al is similar to Si in that it has strong affinity with O, and tends to make hot-dip Al plating difficult. Moreover, since Al forms $Al_2O_3$ inclusions to lower the formability of a steel sheet, the content of Al is determined to be up to 0.1% as acid-soluble Al. Although the lower limit is not determined specifically, addition of Al to some extent is preferred because it inhibits formation of surface defects caused by Ti oxides. A preferred addition range is from 0.01 to 0.05%.

B: B is an element important in ensuring the air-tightness after welding in the present invention. B has been known to improve the secondary formability, at the time of suffering outer force subsequent to deep drawing once, and the fatigue strength. The present inventors have further found that the grain structure in the weld zone subsequent to Al plating is modified so that the air-tightness of the weld zone is greatly improved. In order to obtain such effects, B must be added in an amount of at least 0.0001%. Moreover, the B addition naturally exerts effects on the secondary formability and fatigue strength. In order to obtain stabilized properties, addition of B in an amount of at least 0.0003% (3 ppm) is desired. However, when the addition amount becomes excessive, the high temperature strength becomes overly high, and the capability of being hot rolled decreases. Accordingly, the upper limit is determined to be 0.0030%.

Cr: Cr is an element which increases the potential of the steel sheet. Addition of the element can decrease the potential difference between the alloy layer and the steel sheet substrate. Cr in an amount of at least 0.5% is necessary for achieving the effects. Moreover, when the Cr content exceeds 7%, the surface enrichment of Cr oxides becomes significant in the hot-dip plating step, and plating becomes difficult in a conventional process. Accordingly, the above-mentioned value is determined to be the upper limit.

Cu, Ni, Mo: These elements can be added if necessary. Cu, Ni and Mo are elements which contribute to the improvement of the corrosion resistance of the steel sheet. Ni and Mo particularly improve the pitting corrosion resistance. In order to manifest these effects, Cu, Ni and Mo must be added in an amount of at least 0.05%. On the other hand, excessive addition of Cu may cause the formation of scabs during hot rolling. Since the effects of adding Ni and Mo are saturated even when they are added excessively, the upper limit content is determined to be 0.5% (Cu, Ni, Mo)

Next, reasons for the restriction of the plating layer will be explained. The addition amount of Si in the plating layer will be explained. The element is usually added in an amount of approximately 10% usually for the purpose of thinning the alloy layer. As described above, the alloy layer formed during hot-dip Al plating is very hard and brittle. The alloy layer, therefore, tends to become the starting point of destruction, and reduces the ductility of the steel sheet itself. Even an ordinary alloy layer having a thickness of about 2 to 3 $\mu$m lowers the ductility of the steel sheet by 2 to 5 points (2 to 5%). Accordingly, when the alloy layer is thinner, it acts more advantageously toward forming. The effects of adding Si on decreasing the alloy layer thickness is not significant unless it is not added in an amount of at least 2%. Moreover, when the addition amount exceeds 13%, Si tends to become electrochemically cathodic in addition to the saturation of the addition effects. Accordingly, an increase in the Si content results in deterioration of the corrosion resistance of the plating layer. The Si content is, therefore, restricted to 2 to 13%.

When the amount of the Al plating increases, the corrosion resistance of the steel sheet increases, whereas the adhesion of the plating and the weldability tend to be deteriorated. The fuel tank material for automobiles which must be subjected to severe forming and welding is preferred to be plated in an amount of up to 50 g/m$^2$ per side. On the other hand, since a thick alloy layer exerts adverse effects on the ductility of the Al-plated steel sheet as described above, a thinner alloy layer is more preferred.

In the present invention, it has been discovered that improvement of the ductility of the steel sheet is effective in inhibiting crack formation in the Al plating layer. When the steel sheet has a total elongation of at least 45% after Al plating, cracks are hardly formed even when the steel sheet is formed severely and, therefore, the corrosion resistance subsequent to forming is also improved. The total elongation is restricted to at least 45% for the reasons mentioned above. Though reasons for inhibiting the crack formation are not definite, stress concentrations of some kind appears to be relaxed. Although a higher upper limit is better, the production of the steel sheet having a total elongation exceeding 60% becomes uneconomical, the total elongation of 60% becomes a practical upper limit.

The steel sheet may be subjected to chromate treatment as a primary rust prevention, temper rolling for adjusting the surface condition and the material quality, resin coating for imparting lubricity, and the like treatment as after treatment of the plating. In the present invention, a chromate coating is preferably imparted to the steel sheet after plating. Any of the known chromates such as an inorganic chromate and an organic chromate may be employed, and any of the known chromate treatments such as a coating procedure and a reaction procedure may be employed. The chromate treatment mainly improves the weldability, and the treatment naturally improves the corrosion resistance in addition to the weldability. The coating amount of the chromate is determined to be from 5 to 100 mg/m$^2$ per side as Cr. The coating amount is decided as mentioned above because the effects on the weldability are not significant 2 when the coating amount is less than 5 mg/m$^2$, and because the effects are saturated when the coating amount is at 2 least 100 mg/m$^2$. Moreover, a resin coating is preferably imparted to the top surface of the steel sheet.

The resin coating contributes to the lubricity, inhibition of a reaction between an electrode and the steel sheet during resistance welding, and the like, improves the properties such as formability and weldability, and comprehensively gives the steel sheet excellent properties for fuel tanks. When the thickness of the organic coating is slight, the steel sheet may be directly coated with the organic coating, or a chromate may be added to the organic coating.

The potential difference between the alloy layer and the steel sheet substrate for plating is determined to be up to 0.35 V. The measurement environment is preferably one containing formic acid so that a corrosion environment close to that within actual fuel tanks is formed. Conventional Al-plated steel sheets show a potential difference of about 0.4 V in such an environment. I-Corrosion tends to proceed between the alloy layer and the steel sheet substrate for plating in such an environment as described above. When the potential difference is small, the corrosion proceeds only slightly in an Al-plated steel sheet which even has cracks in the plating layer and the alloy layer. When the potential difference is within the range, it does not matter whether the alloy layer is nobler than the steel sheet substrate or vice versa. However, it does not appear that the alloy layer actually often becomes baser.

Next, reasons for restricting addition elements in the Al plating layer will be explained. The plating is an Al—Si type one, and Sn, Zn, Sb and Bi can be added in a total amount of 0.5 to 5%. All these elements lower the potential of the alloy layer when mixed therein. The effects are manifested when the elements are added in a total amount of at least 0.5%. Since excessive addition of the elements deteriorates the corrosion resistance of the plating layer, the upper limit is determined to be 5%.

The steel sheet is produced by a conventional process. The molten steel is prepared by adjusting the chemical composition using, for example, converter-vacuum degassing treatment, and the slab is produced by continuous casting, or the like process, followed by hot rolling the slab. The conditions of the hot rolling and cold rolling subsequent thereto influence the deep drawability of the steel sheet. In order to impart a particularly excellent deep drawability to the steel sheet, the following procedures are recommended: the heating temperature of the steel at the time of hot rolling is as low as about 1,150° C.; the finish temperature of hot rolling is as low as about 800° C.; the coiling temperature is as high as at least 600° C.; and the reduction of the cold rolling is as high as about 80%.

EXAMPLES

The present invention will be explained in more detail by making reference to examples.

Example 1

Steels shown in Table 1 were prepared in a molten state by converter-vacuum degassing treatment, and steel slabs were prepared therefrom. The steel slabs were heated to a temperature from 1,130 to 1,170° C., and hot rolled at a finish temperature of 870 to 920° C. and a coiling temperature of 600 to 630° C., followed by cold rolling with a reduction of 80% to give cold rolled steel sheets, in coils, having a thickness of 0.8 mm. The hot rolling conditions of part of the materials were adjusted so that the elongation did not become significant. The resultant steel sheets were used as substrates, and hot-dip plated with aluminum. The hot-dip aluminum plating was conducted in a non-oxidizing furnace-reducing furnace type line, and annealing was also conducted in the hot-dip plating line. The annealing temperature was from 800 to 850° C. The plating thickness was adjusted by gas wiping so that both sides of each of the steel sheets subsequent to plating had a plating in an amount of about 60 g/m$^2$. The plating temperature was set at 660° C. during plating, and the plating bath composition was prepared by adding Si to Al. The plating bath was sometimes contaminated with Fe as an impurity from plating apparatuses in the bath and the steel sheets. The properties as fuel tanks of the Al-plated steel sheets thus produced were evaluated. The evaluation methods are as described below, and the plating conditions and the results of evaluating the properties are shown in Table 2.

TABLE 1

| | Chemical composition of steel (×10$^{-3}$ wt. %) | | | | | | | | |
|---|---|---|---|---|---|---|---|---|---|
| No. | C | Si | Mn | P | S | Ti | Al | Nb | N | Note |
| A | 0.5 | 12 | 130 | 5 | 7 | 33 | 30 | — | 1.6 | S.I.* |
| B | 0.8 | 19 | 170 | 7 | 9 | 45 | 33 | — | 2.2 | S.I. |
| C | 1.3 | 21 | 220 | 7 | 8 | 56 | 38 | — | 2.6 | S.I. |
| D | 1.8 | 22 | 200 | 9 | 10 | 61 | 40 | — | 2.3 | S.I. |
| E | 2.7 | 26 | 260 | 10 | 12 | 58 | 38 | 1 | 2.1 | S.I. |
| F | 1.3 | 12 | 150 | 9 | 8 | 75 | 33 | — | 2.3 | S.I. |
| G | 0.5 | 13 | 170 | 8 | 12 | 3 | 18 | — | 2.2 | S.I. |
| H | 3.4 | 19 | 220 | 12 | 10 | 60 | 35 | 1 | 3.5 | C.S.# |
| I | 1.8 | 35 | 210 | 15 | 12 | 61 | 40 | — | 2.5 | C.S. |
| J | 1.6 | 22 | 330 | 11 | 10 | 36 | 33 | — | 2.9 | C.S. |
| K | 2.2 | 23 | 240 | 23 | 10 | 40 | 30 | — | 2.5 | C.S. |
| L | 2.4 | 18 | 290 | 13 | 12 | 30 | 31 | 1 | 6.5 | C.S. |
| M | 2.2 | 17 | 250 | 12 | 13 | 125 | 44 | — | 3.0 | C.S. |

Note:
*: S.I. = Steel of invention
: C.S. = Comparative steel

TABLE 2

| No. | Steel sheet substrate | Si content in bath (wt. %) | Appearance | Total elongation (%) | Press formability | Corrosion resistance after forming | Comprehensive evaluation+ | Note |
|---|---|---|---|---|---|---|---|---|
| 1 | A | 9.4 | ○ | 49.3 | ⊕ | ○ | ○ | E.I.* |
| 2 | B | 9.4 | ○ | 48.8 | ⊕ | ○ | ○ | E.I. |
| 3 | C | 9.4 | ○ | 48.2 | ⊕ | ○ | ○ | E.I. |
| 4 | D | 9.4 | ○ | 47.4 | ⊕ - ○ | ○ - Δ | ○ - Δ | E.I. |
| 5 | E | 9.4 | ○ | 46.9 | ⊕ - ○ | ○ - Δ | ○ - Δ | E.I. |
| 6 | F | 9.4 | ○ | 47.4 | ⊕ | ○ | ○ | E.I. |
| 7 | G | 9.4 | ○ | 49.6 | ⊕ | ○ | ○ | E.I. |
| 8 | B | 4.8 | ○ | 46.5 | ⊕ - ○ | ○ - Δ | ○ | E.I. |
| 9 | B | 11.4 | ○ | 48.6 | ⊕ | ○ | ○ - Δ | E.I. |
| 10 | H | 9.4 | ○ | 44.3 | x | x | x | C.E.# |
| 11 | I | 9.4 | Δ | 44.9 | x | x | x | C.E. |
| 12 | J | 9.4 | ○ | 45.8 | x | x | x | C.E. |
| 13 | K | 9.4 | ○ | 43.5 | — | — | x | C.E. |
| 14 | L | 9.4 | ○ | 43.8 | — | — | x | C.E. |
| 15 | M | 9.4 | ○ | 43.6 | — | — | x | C.E. |
| 16 | B | 1.5 | ○ | 42.5 | — | — | x | C.E. |
| 17 | B | 14.0 | ○ | 48.5 | ○ | x | x | C.E. |
| 18 | B | 9.4 | ○ | 43.8 | — | — | x | C.E. |

Note:
*: E.I. = Example of invention, #: C.E. = Comparative example
+: Comprehensive evaluation
⊕ very excellent
○: excellent
Δ: usable though deteriorated slightly
x: unusable (1) Evaluation of Appearance The appearance of a steel sheet subsequent to plating was visually judged.

[Criteria of Evaluation]
○: no abnormality
Δ: very fine spot-like plateless portions being present
x: plateless portions being present (2) Quality of the Material Subsequent to Plating A tensile test is conducted on a test piece (JIS No. 5) in accordance with JIS Z2241.

(3) Evaluation of Press Formability

A forming test is conducted at a drawing ratio of 2.4 using a hydraulic forming testing machine and a cylindrical punch having a diameter of 50 mm. The blank holder pressure is set at 500 kg during the test, and the formability is evaluated as follows.

[Criteria of Evaluation]
⊕: the test piece being formable, and no defect being formed in the plating layer
Δ: the test piece being formable, and cracks being formed in the plating layer
x: the test piece being formable, and the plating layer being peeled off
-: the test piece being not formable (cracks being formed in the steel sheet substrate)

(4) Evaluation of Corrosion Resistance Subsequent to Forming

A hydraulic type mold with a bead is attached to a tensile testing machine, and a steel sheet is held with hydraulic pressure, and bead drawn. The bead has a diameter of 4 mm, and is semicircular. The hydraulic pressure is 600 kgf. The sample, having been bead drawn, and a fuel are sealed in a glass container, and the corrosion resistance of the sample is evaluated. The test liquid is gasoline +10% of distilled water +200 ppm of formic acid. The test is continued for 3 months at room temperature. The corrosion state of the sample subsequent to the test is visually observed.

[Criteria of Evaluation]
○: rust being formed in an area less than 0.1%
Δ: rust being formed in an area of 0.1 to 5%, or white rust being formed
x: rust being formed in an area exceeding 5%, or white rust being formed significantly
-: the sample being not formable, and the corrosion state being not evaluated As shown in Table 2, when a steel sheet has a high C or N content (Comparative Examples 10, 14), or when a steel sheet has an insufficient elongation due to a high P or Mn content (Comparative Examples 12, 13), the steel sheet shows a deteriorated press formability, and is difficult to deep draw as in the preparation of a fuel tank. Moreover, when a steel sheet has a high content of such an element hindering the steel sheet from being hot-dip plated with Al as Si (Comparative Example 11), many plateless portions are formed. Since corrosion proceeds from the plateless portions, the corrosion resistance is naturally deteriorated. When a steel sheet has an excessively high Ti content (Comparative Example 15) in the steel, or when it has a low Si content in the Al plating (Comparative Example 16), the alloy layer is thickly developed, and the plating tends to be peeled off during pressing. Consequently, the corrosion resistance is also deteriorated. On the other hand, when the plating has an excessive Si content (Comparative Example 17), the corrosion resistance is also deteriorated. Even when the chemical composition of a steel sheet is proper, the steel sheet is also incapable of being severely formed when the steel sheet has a low elongation due to the hot rolling conditions (Comparative Example 18). When the chemical composition of a steel sheet and the chemical composition of the plating are proper, a hot-dip Al-plated steel sheet excellent in all of the following properties can be obtained: press formability, appearance and corrosion resistance subsequent to forming.

Example 2

The cold rolled steel sheets having chemical compositions as shown in Table 1 were used as steel sheet substrates, and hot-dip plated with Al. The hot-dip plating conditions were the same as in Example 1 except that the chemical composition of the plating was Al-9.4% Si and that the amount of the plating which was uniform on both sides was varied from 50 to 120 g/m$^2$ on both sides. Part of the hot-dip Al-plated steel sheet was chromated with a chromic acid-silica sol-phosphoric acid-organic resin system. Part of the chromated steel sheet was further coated with an epoxy resin. The properties of the materials thus obtained were evaluated as fuel tanks by evaluating the weldability thereof by the same methods as in Example 1. Table 3 shows the structures of the plating and coatings, and the results of evaluating the properties. In Table 3, the plating amount designates a total plating amount on both sides, and the coating amount of Cr and the coating thickness designate respective values per side.

(1) Method of Evaluating Weldability

Spot welding is conducted under the conditions as described below, and the weldability is evaluated from the number of continuous spot welding conducted until the nugget diameter becomes less than $4\sqrt{t}$ (t: sheet thickness). When the steel sheet sample has a single-sided coating, the two samples are stacked so that one of the samples has the resin coating inside and the other sample has the resin coating outside.

[Welding Conditions]

Welding current: 10 kA, applied pressure: 200 kg, welding time: 12 cycles, and electrode: a Cu type electrode having a diameter of 6 mm

[Criteria of Evaluation]

○: the number of continuous spot weldings exceeding 1,200

Δ: the number of continuous spot welding being from 400 to 1,200 x: the number of continuous spot welding being less than 400

As shown in Table 3, when the plating amount of Al on both sides is 120 g/M$^2$ (Example 9), or when the coating amount of chromate is slight, the weldability is somewhat lowered. Accordingly, materials excellent in productivity can be obtained when such conditions are avoided. Moreover, the chromate coating and the resin coating stabilize the corrosion resistance and the weldability after forming.

TABLE 3

| No. | Plating amount on both sides (g/m$^2$) | Coating amount of Cr (mg/m$^2$) | Resin coating thickness (μm) | Corrosion resistance after forming | Weldability | Comprehensive evaluation+ | Note |
|---|---|---|---|---|---|---|---|
| 1 | 50 | 15 | — | ○ | ○ | ○ | E.I.* |
| 2 | 50 | 40 | — | ○ | ○ | ○ | E.I. |
| 3 | 50 | 60 | — | ○ | ○ | ○ | E.I. |
| 4 | 50 | 90 | — | ○ | ○ | ○ | E.I. |
| 5 | 50 | 20 | 1 | ○ | ○ | ○ | E.I. |
| 6 | 50 | 20 | 2 | ○ | ○ | ○ | E.I. |
| 7 | 80 | 15 | — | ○ | ○ | ○ | E.I. |
| 8 | 100 | 15 | — | ○ | ○ | ○ | E.I. |
| 9 | 120 | 15 | — | ○ | Δ | Δ | E.I. |
| 10 | 50 | 3 | — | ○ | Δ | Δ | E.I. |
| 11 | 50 | — | 0.5 | ○ | ○ | ○ | E.I. |
| 12 | 50 | 50 | 0.5 | ○ | ○ | ○ | E.I. |

Note:
*: E.I. = Example of invention
+: Comprehensive evaluation
○: excellent
Δ: usable though deteriorated slightly
x: unusable
No. 12: chromate being added to the resin

Example 3

Steels shown in Table 4 were prepared in a molten state by converter-vacuum degassing treatment, and steel slabs were prepared therefrom. The steel slabs were hot rolled and cold rolled under ordinary conditions to give cold rolled steel sheets having a thickness of 0.8 mm. The resultant steel sheets were used as substrates, and hot-dip plated with aluminum. The hot-dip aluminum plating was conducted in a non-oxidizing furnace-reducing furnace type line, and annealing was also conducted in the hot-dip plating line. The annealing temperature was from 800 to 850° C. The plating thickness was adjusted by gas wiping so that both sides of each of the steel sheets subsequent to plating had a plating amount of about 60 g/m$^2$. The plating temperature was set at 660° C. during plating. The chemical composition of the plating bath was fundamentally determined to be Al-2% Fe, and Si was added thereto. Fe in the plating bath was supplied thereto from plating apparatuses in the bath and the steel sheets. The properties as fuel tanks of the Al-plated steel sheets thus produced were evaluated. The evaluation methods are as described below, and the plating conditions and the results of evaluating the properties are shown in Table 5.

TABLE 4

| | | Chemical composition of steel | | | | | | | | | Atomic equivalent |
|---|---|---|---|---|---|---|---|---|---|---|---|
| | | (×10$^{-2}$ wt. %) | | | | (×10$^{-3}$ wt. %) | | | (wt. ppm) | | Ti + Nb |
| | No. | C | Si | Mn | P | S | Ti | Al | Nb | B | N | C + N |
| S.I.* | A | 0.07 | 1.9 | 24 | 8 | 9 | 25 | 38 | — | 1 | 22 | 2.4 |
| S.I. | B | 0.08 | 2.0 | 22 | 11 | 10 | 48 | 33 | — | 3 | 24 | 4.2 |
| S.I. | C | 0.08 | 2.0 | 19 | 5 | 10 | 55 | 40 | — | 4 | 25 | 4.7 |
| S.I. | D | 0.09 | 1.9 | 23 | 7 | 10 | 50 | 33 | — | 5 | 22 | 4.5 |
| S.I. | E | 0.08 | 1.9 | 24 | 9 | 10 | 55 | 38 | — | 10 | 22 | 5.1 |
| S.I. | F | 0.21 | 2.1 | 23 | 12 | 11 | 91 | 41 | — | 3 | 28 | 3.8 |
| S.I. | G | 0.09 | 2.2 | 25 | 14 | 10 | 47 | 39 | — | 4 | 30 | 3.4 |
| S.I. | H | 0.25 | 4.0 | 32 | 13 | 19 | 92 | 62 | — | 5 | 28 | 4.7 |
| S.I. | I | 0.50 | 15.3 | 44 | 21 | 12 | 180 | 83 | — | 19 | 55 | 4.6 |
| S.I. | J | 0.08 | 2.6 | 26 | 35 | 12 | 55 | 28 | — | 3 | 22 | 5.1 |
| S.I. | K | 0.14 | 2.5 | 31 | 12 | 11 | — | 45 | 34 | 4 | 23 | 1.3 |

TABLE 4-continued

|  |  | Chemical composition of steel | | | | | | | | | Atomic equivalent |
|---|---|---|---|---|---|---|---|---|---|---|---|
|  |  | ($\times 10^{-2}$ wt. %) | | | ($\times 10^{-3}$ wt. %) | | | | | (wt. ppm) | Ti + Nb |
|  | No. | C | Si | Mn | P | S | Ti | Al | Nb | B | N | C + N |
| S.I. | L | 0.20 | 4.8 | 33 | 9 | 15 | — | 61 | 74 | 4 | 21 | 2.5 |
| S.I. | M | 0.80 | 3.7 | 44 | 22 | 23 | 32 | 33 | 45 | 4 | 33 | 1.3 |
| C.S.# | N | 1.2 | 3.9 | 32 | 13 | 18 | 35 | 29 | — | 4 | 25 | 0.6 |
| C.S. | O | 0.25 | 25.0 | 30 | 15 | 16 | 61 | 119 | — | 4 | 25 | 3.3 |
| C.S. | P | 0.45 | 3.2 | 63 | 51 | 13 | 36 | 33 | — | 4 | 29 | 1.3 |
| C.S. | Q | 0.25 | 2.3 | 31 | 16 | 13 | 40 | 30 | — | 4 | 125 | 0.8 |
| C.S. | R | 0.15 | 1.8 | 29 | 13 | 12 | 60 | 31 | — | — | 29 | 3.8 |
| C.S. | S | 0.42 | 3.9 | 40 | 8 | 13 | 228 | 44 | — | 4 | 30 | 8.4 |

Note:
*: S.I. = Steel of invention
: C.S. = Comparative steel (1) Evaluation of Appearance The appearance of a steel sheet subsequent to plating is visually judged.

[Criteria of Evaluation]

○: no abnormality

Δ: very fine spot-like plateless portions being present x: plateless portions being present (2) Evaluation of Press Formability A forming test is conducted at a drawing ratio of 2.3 using a hydraulic forming testing machine and a cylindrical punch having a diameter of 50 mm. The blank holder pressure is set at 500 kg during the test, and the formability is evaluated as follows.

[Criteria of Evaluation]

⊕: the test piece being formable, and no defect being formed in the plating layer ○: the test piece being formable, and cracks being formed in the plating layer Δ: the test piece being formable, and the plating layer being peeled off x: the test piece being not formable (cracks being formed in the steel sheet substrate)

(3) Evaluation of Air-Tightness After Welding in Weld Zone

A flat bottom square cylinder having a flange width of 30 mm, a depth of 25 mm and a side of 70 mm (two adjacent sides: 70×70 mm) is formed by a crank press testing machine. The flange portion is seam welded under the conditions as described below. A hole is formed at a part of it, and internal air pressures of 0.5, 1 and 1.5 atm. are applied from the hole. The leak of the air from the seam weld zone is judged.

[Welding Conditions]

Welding current: 10 kA, applied pressure: 200 kg and welding speed: 2.5 m/sec

[Criteria of Evaluation]

⊕ no leak being detected from a weld zone

○: no leak being detected at pressures up to 1 atm.

Δ: no leak being detected at pressures up to 0.5 atm.

x: a leak being detected even at a pressure of 0.5 atm.

(4) Evaluation of Corrosion Resistance

The corrosion resistance to gasoline of a steel sheet is evaluated. The procedure is as described below. The steel sheet is drawn by a hydraulic forming testing machine to give a sample which is a flat bottom cylinder having a flange width of 20 mm, a diameter of 50 mm and a depth of 25 mm. A test liquid is placed in the sample, and covered with a glass lid through a silicone rubber ring. The test is continued for 3 months at room temperature, and the corrosion state of the sample subsequent to the test is visually observed.

Test liquid: gasoline+10% of distilled water+200 ppm of formic acid

[Criteria of Evaluation]

-: the test piece being not formable, and the corrosion state being not evaluated ○: rust being formed in an area less than 0.1%

Δ: rust being formed in an area of 0.1 to 5%, or white rust being formed.

x: rust being formed in an area exceeding 5%, or white rust being formed significantly As shown in Table 5, when a steel sheet has a high content of C or N and an atomic equivalent (Ti+Nb)/(C+N) of less than 1 (Comparative Examples 16, 19), or when a steel sheet has an insufficient ductility due to high contents of P and Mn (Comparative Example 18), the steel sheet shows a deteriorated press formability, and becomes difficult to deep draw to give products such as fuel tanks. Moreover, when the contents of such elements hindering hot-dip Al plating as Si and Al are high (Comparative Example 17), many plateless portions are formed, and corrosion proceeds therefrom. Consequently, the corrosion resistance naturally deteriorates. Furthermore, when the Ti content in the steel is excessively high (Comparative Example 21), or when the Si content in the Al plating is low (Comparative Example 22), the alloy layer thickly develops, and as a result it tends to be peeled off during pressing, whereby the corrosion resistance is also deteriorated. On the other hand, when the Si content is high in the plating (Comparative Example 23), the corrosion resistance is deteriorated. When B is not added to the steel (Comparative Example 20), the weld zone shows a deteriorated air-tightness though other properties are excellent. When the chemical compositions of the steel and the plating are proper, a hot-dip Al-plated steel sheet excellent in all the following properties is obtained: press formability, air-tightness in the weld zone, appearance and corrosion resistance. However, when the B content is slightly insufficient, or when the P content is high (Examples 1, 9, 10, 13), the air-tightness in a weld zone tends to deteriorate slightly. Even when the P content exceeds 0.01% (Examples 2, 6, 7, 8, 11), the air-tightness slightly deteriorates compared with that of a steel sheet having a lower P content. On the other hand, when the contents of elements such as C, Si and Mn are high in the steel (Examples 9, 13), the formability tends to deteriorate slightly. Accordingly, when the contents of these elements are made proper, a hot-dip Al-plated steel sheet having more excellent properties is obtained.

sheets had a plating amount of about 60 mg/m². The plating temperature was set at 660° C. during plating. The chemical composition of the plating bath was determined to be Al-9.4% Si. Fe in the plating bath was supplied thereto as an impurity from plating apparatuses in the bath and the steel sheets. Part of the Al-plated steel sheets thus produced were

TABLE 5

|  | No. | Steel sheet substrate | Si content in bath (wt. %) | Appearance | Press formability | Airtightness in weld zone | Corrosion resistance | Comprehensive evaluation |
|---|---|---|---|---|---|---|---|---|
| Ex. I.* | 1 | A | 9.4 | ○ | ⊕ | Δ | ○ | Δ |
| Ex. I. | 2 | B | 9.4 | ○ | ⊕ | ○ | ○ | ○ |
| Ex. I. | 3 | C | 9.4 | ○ | ⊕ | ⊕ | ○ | ⊕ |
| Ex. I. | 4 | D | 9.4 | ○ | ⊕ | ⊕ | ○ | ⊕ |
| Ex. I. | 5 | E | 9.4 | ○ | ⊕ | ⊕ | ○ | ⊕ |
| Ex. I. | 6 | F | 9.4 | ○ | ⊕ | ○ | ○ | ○ |
| Ex. I. | 7 | G | 9.4 | ○ | ⊕ | ○ | ○ | ○ |
| Ex. I. | 8 | H | 9.4 | ○ | ⊕ | ○ | ○ | ○ |
| Ex. I. | 9 | I | 9.4 | ○ | ○ | Δ | ○ | Δ |
| Ex. I. | 10 | J | 9.4 | ○ | ⊕ | Δ | ○ | Δ |
| Ex. I. | 11 | K | 9.4 | ○ | ⊕ | ○ | ○ | ○ |
| Ex. I. | 12 | L | 9.4 | ○ | ⊕ | ⊕ | ○ | ⊕ |
| Ex. I. | 13 | M | 9.4 | ○ | ○ | ○ | ○ | ○ |
| Ex. I. | 14 | C | 5.2 | ○ | ⊕ | ⊕ | ○ | ⊕ |
| Ex. I. | 15 | C | 11.4 | ○ | ⊕ | ⊕ | ○ | ⊕ |
| C. Ex.# | 16 | N | 9.4 | ○ | x | ○ | — | x |
| C. Ex. | 17 | O | 9.4 | x | Δ | ○ | x | x |
| C. Ex. | 18 | P | 9.4 | ○ | x | ○ | — | x |
| C. Ex. | 19 | Q | 9.4 | ○ | x | ○ | — | x |
| C. Ex. | 20 | R | 9.4 | ○ | ⊕ | x | ○ | x |
| C. Ex. | 21 | S | 9.4 | ○ | Δ | ○ | x | x |
| C. Ex. | 22 | A | 1.5 | ○ | Δ | ○ | x | x |
| C. Ex. | 23 | A | 14.0 | ○ | ○ | ⊕ | x | x |

Note:
*: Ex. I. = Example of invention
: C. Ex. = Comparative example
Comprehensive evaluation
⊕: extremely excellent
○: excellent
Δ: usable though deteriorated slightly
x: unusable Example 4

Steels (P: 0.008%, S: 0.010%) shown in Table 6 were prepared in a molten state by converter-vacuum degassing treatment, and steel slabs were prepared therefrom. The steel slabs were hot rolled at a heating temperature from 1,140 to 1,180° C., a finishing temperature from 800 to 900° C. and a coiling temperature from 620 to 670° C. The hot rolled steel sheets were cold rolled with a reduction of about 80% to give a cold rolled steel sheet having a thickness of 0.8 mm. The resultant steel sheets were used as substrates, and hot-dip plated with aluminum. The hot-dip aluminum plating was conducted in a non-oxidizing furnace-reducing furnace type line, and annealing was also conducted in the hot-dip plating line. The annealing temperature was from 800 to 850° C. After plating, the plating thickness was adjusted by gas wiping so that both sides of each of the steel subjected to ground coat treatment with a chromic acid-silica sol-phosphoric acid-organic resin (acrylic) system. Moreover, part of the treated steel sheets were coated with a resin coating. During the treatment, the resin component of the chromate treatment was increased or decreased. The properties as fuel tanks of the Al-plated steel sheets thus produced were evaluated. The evaluation methods are as described below, and the plating conditions and the results of evaluating the properties are shown in Tables 7 and 8. In addition, analysis of the composition of any of the Al plating layers was carried out by sampling a solution obtained by electrolytically stripping the Al plating layer alone in 3% NaOH+1% AlCl.6H$_2$O, treating the solution with acid, and quantitatively analyzing the treated solution by inductively coupled plasma-atomic emission spectroscopy. As a result, the Si composition in the plating layer was obtained.

TABLE 6

| | Chemical composition of steel ($\times 10^{-3}$ wt. %) | | | | | | | | Ti + Nb | |
|---|---|---|---|---|---|---|---|---|---|---|
| No. | C | Si | Mn | Ti | Al | N | Cr | Other elements | (C + N) | Note |
| A | 0.8 | 13 | 140 | 33 | 30 | 1.6 | 710 | — | 3.8 | S.I.* |
| B | 2.1 | 19 | 180 | 45 | 31 | 2.2 | 1150 | — | 2.8 | S.I. |

TABLE 6-continued

| | Chemical composition of steel (×10⁻³ wt. %) | | | | | | | | Ti + Nb | |
|---|---|---|---|---|---|---|---|---|---|---|
| No. | C | Si | Mn | Ti | Al | N | Cr | Other elements | (C + N) | Note |
| C | 3.3 | 26 | 220 | 56 | 38 | 6.6 | 2090 | — | 1.6 | S.I. |
| D | 2.8 | 23 | 200 | 61 | 71 | 2.5 | 4110 | — | 3.1 | S.I. |
| E | 2.7 | 46 | 260 | 78 | 38 | 2.1 | 6050 | — | 4.3 | S.I. |
| F | 1.5 | 12 | 680 | 65 | 43 | 2.3 | 1250 | Cu90 Ni100 | 4.7 | S.I. |
| G | 1.9 | 63 | 170 | 88 | 28 | 2.2 | 1520 | Ni70 Mo130 | 5.8 | S.I. |
| H | 2.2 | 25 | 200 | 70 | 38 | 3.0 | 1400 | Cu60 B0.4 | 3.7 | S.I. |
| I | 2.3 | 21 | 210 | 64 | 41 | 2.8 | 1820 | Nb25 B1.3 | 4.1 | S.I. |
| J | 14 | 43 | 320 | 62 | 35 | 3.5 | 20 | — | 0.9 | S.O.# |
| K | 1.8 | 125 | 240 | 61 | 40 | 2.5 | 10 | — | 3.9 | S.O. |
| L | 2.5 | 22 | 1230 | 37 | 35 | 2.9 | 10 | — | 1.9 | S.O. |
| M | 2.2 | 23 | 240 | 134 | 30 | 2.5 | 10 | Nb83 | 10.2 | S.O. |
| N | 2.4 | 18 | 290 | 40 | 125 | 7.5 | 10 | — | 0.9 | S.O. |
| O | 2.1 | 17 | 220 | 45 | 44 | 2.2 | 10 | — | 2.8 | S.O. |
| P | 2.3 | 20 | 290 | 45 | 33 | 2.8 | 260 | Cu660 | 2.4 | S.O. |

Note:
*: S.I. = Steel of invention
: S.O. = Steel outside the scope of invention

TABLE 7

| | | Ground coat | | Coating | |
|---|---|---|---|---|---|
| No. | Structure | Amount of Cr (mg/m²) | Resin/Cr | thickness (μm) | Type of resin |
| (1) | ground coat alone | 3 | 10.0 | — | — |
| (2) | ground coat alone | 10 | 8.0 | — | — |
| (3) | ground coat alone | 40 | 4.0 | — | — |
| (4) | ground coat alone | 70 | 3.0 | — | — |
| (5) | ground coat alone | 90 | 3.0 | — | — |
| (6) | ground coat + coating | 20 | 0.5 | 1.0 | epoxy |
| (7) | ground coat + coating | 25 | 1.0 | 1.5 | acrylic |

Note:
Amount of Cr and coating thickness each relate to an amount or thickness per side.

TABLE 8

| No. | Steel sheet substrate | Si in plating (wt. %) | After treatment | Appearance | Potential difference between steel and alloy layer (V) | Press formability | Corrosion resistance after forming | Comprehensive evaluation* | Note |
|---|---|---|---|---|---|---|---|---|---|
| 1 | A | 9.4 | (6) | ○ | 0.35 | ⊕ | Δ | Δ | E.I.* |
| 2 | B | 9.4 | (6) | ○ | 0.33 | ⊕ | ○ | ○ | E.I. |
| 3 | C | 9.4 | (6) | ○ | 0.28 | ⊕-○ | ○ | ○ | E.I. |
| 4 | D | 9.4 | (6) | ○ | 0.05 | ⊕ | ○ | ○ | E.I. |
| 5 | E | 9.4 | (6) | ○ | −0.02 | ⊕ | ○ | ○ | E.I. |
| 6 | F | 9.4 | (6) | ○ | 0.32 | ⊕-○ | ○ | ○ | E.I. |
| 7 | G | 9.4 | (6) | ○ | 0.31 | ⊕-○ | ○ | ○ | E.I. |
| 8 | H | 9.4 | (6) | ○ | 0.31 | ⊕ | ○ | ○ | E.I. |
| 9 | I | 9.4 | (6) | ○ | 0.30 | ⊕ | ○ | ○ | E.I. |
| 10 | B | 4.8 | (6) | ○ | 0.32 | ⊕-○ | ○ | ○ | E.I. |
| 11 | B | 11.4 | (6) | ○ | 0.33 | ⊕ | ○ | ○ | E.I. |
| 12 | B | 9.4 | (1) | ○ | 0.32 | ⊕ | ○ | ○ | E.I. |
| 13 | B | 9.4 | (2) | ○ | 0.33 | ⊕ | ○ | ○ | E.I. |
| 14 | B | 9.4 | (3) | ○ | 0.33 | ⊕ | ○ | ○ | E.I. |
| 15 | B | 9.4 | (4) | ○ | 0.32 | ⊕ | ○ | ○ | E.I. |
| 16 | B | 9.4 | (5) | ○ | 0.33 | ⊕ | ○ | ○ | E.I. |
| 17 | B | 9.4 | (7) | ○ | 0.33 | ⊕ | ○ | ○ | E.I. |
| 18 | J | 9.4 | (6) | ○ | 0.41 | — | — | x | C.E.# |
| 19 | K | 9.4 | (6) | Δ | 0.40 | x | x | x | C.E. |
| 20 | L | 9.4 | (6) | ○ | 0.40 | — | — | x | C.E. |
| 21 | M | 9.4 | (6) | ○ | 0.42 | x | x | x | C.E. |

TABLE 8-continued

| No. | Steel sheet substrate | Si in plating (wt. %) | After treatment | Appearance | Potential difference between steel and alloy layer (V) | Press formability | Corrosion resistance after forming | Comprehensive evaluation* | Note |
|---|---|---|---|---|---|---|---|---|---|
| 22 | N | 9.4 | (6) | Δ | 0.42 | — | — | x | C.E. |
| 23 | O | 9.4 | (6) | ○ | 0.42 | ⊕ | x | x | C.E. |
| 24 | P | 9.4 | (6) | ○ | 0.38 | ⊕ | x | x | C.E. |
| 25 | B | 1.5 | (6) | ○ | 0.33 | — | — | x | C.E. |
| 26 | B | 14.0 | (6) | ○ | 0.33 | ○ | x | x | C.E. |
| 27 | B | 9.4 | — | ○ | 0.33 | — | — | x | C.E. |

Note:
*: E.I.: = Example of invention
: C.E. = Comparative example
+: Comprehensive evaluation
⊕: very excellent
○: excellent
Δ: usable though deteriorated slightly
x: unusable (1) Evaluation of Appearance The appearance subsequent to plating is visually judged.

[Criteria of Evaluation]

○: no abnormality Δ: very fine spot-like plateless portions being present x: plateless portions being present (2) Potential Difference between Alloy Layer and Steel Substrate The Al plating layer is electrolytically stripped in 3% NaOH+1% $AlCl_3.6H_2O$ to give a sample for measuring the potential of the alloy layer. Moreover, the steel sheet sample is immersed in 20% NaOH to remove the Al plating layer and the alloy layer, whereby a sample for measuring the potential of the steel sheet substrate is obtained. The immersion potential of these samples is measured in a solution at 20° C. containing 100 ppm of formic acid, and the potential difference is obtained. In addition, a saturated calomel electrode is used as a reference electrode, and the result is expressed with a +sign when the alloy layer has a higher potential.

(3) Evaluation of Press Formability

A forming test is conducted at a drawing ratio of 2.2 without coating with oil using a hydraulic forming testing machine and a cylindrical punch having a diameter of 50 mm. The blank holder pressure is set at 500 kg during the test, and the formability is evaluated as follows.

[Criteria of Evaluation]

⊕: the test piece being formable, and no large defect being formed in the plating layer Δ: the test piece being formable, and visible cracks being formed in the plating layer x: the test piece being formable, and the plating layer being peeled off -: the test piece being not formable (cracks being formed in the steel sheet substrate)

(4) Evaluation of Corrosion Resistance Subsequent to Forming

A hydraulic type mold with a bead is attached to a tensile testing machine, and a steel sheet is held with a hydraulic pressure, and bead drawn. The bead has a diameter of 4 mm, and is semicircular. The hydraulic pressure is 600 kgf. The sample having been bead drawn and a fuel are sealed in a glass container, and the corrosion resistance of the sample is evaluated. The test liquid is gasoline +10% of distilled water +100 ppm of formic acid. The test is continued for 3 months at room temperature (20° C.). The corrosion state of the sample subsequent to the test is evaluated in the form of an amount of Fe elution.

[Criteria of Evaluation]

○: an amount of Fe elution being less than 2 $g/m^2$ Δ: an amount of Fe elution being from 2 to 5 g/m x: an amount of Fe elution exceeding 5 g/m -: forming being impossible, and evaluation being not conducted As shown in Table 7, when a steel sheet has a low Cr content and there is a large potential difference between the steel sheet and the alloy layer (Comparative Examples 23, 24), corrosion of the steel sheet starting from fine cracks in the plating layer proceeds even though the drawability is excellent. When a steel sheet has a high content of C or N and an atomic equivalent (Ti/(C+N)) of less than 1 (Comparative Examples 18, 22), or when a steel sheet has an insufficient ductility due to a high Mn content (Comparative Example 20), the steel sheet shows a deteriorated press formability, and it becomes difficult to deep draw to give products such as fuel tanks. Moreover, when the contents of such elements hindering hot-dip Al plating as Si are high in a steel (Comparative Example 19), many plateless portions are formed, and corrosion proceeds therefrom. Consequently, the corrosion resistance naturally deteriorates.

Furthermore, when the Ti content in a steel is high (Comparative Example 21), or when the Si content in the Al plating is low (Comparative Example 25), the alloy layer thickly develops, and as a result it tends to be peeled off during pressing, whereby the corrosion resistance is also deteriorated. On the other hand, when the Si content is high in the plating (Comparative Example 26), the corrosion resistance is deteriorated. When a steel sheet has no resin coating on the top surface layer (Comparative Example 27), the drawability is deteriorated, and the resistance weldability is also deteriorated though it has not been evaluated herein. When the chemical composition of a steel sheet and the chemical composition of the plating are proper, a hot-dip Al-plated steel sheet excellent in all of the following properties can be obtained: appearance, press formability, appearance, corrosion resistance subsequent to forming and air-tightness after welding.

Example 5

A cold rolled steel sheet having a chemical composition as shown in Table 6 in Example 4 was used as a substrate, and was hot-dip plated with Al. The hot-dip Al plating conditions were as follows: the plating bath was an Al-9% Si bath in principle; and elements such as Sn and Zn were added thereto. In addition, the plating baths (plating layers) were sometimes contaminated with about 2% of Fe. Moreover, part of the steel sheets were pre-plated with Ni type prior to plating with Al. The pre-plating conditions were as follows: plating bath: a Watts bath; and a current density: 30 A/dm$^2$. The steel sheet having been plated with Al was subjected to the after treatment of (6) in Table 2 in Example 4. The properties as fuel tanks of these materials thus obtained were evaluated in accordance with the evaluation methods in Example 4. All these samples were excellent in appearance, press formability and air-tightness after welding.

As shown in Table 9, when the potential difference between the steel and the alloy layer is controlled by Ni pre-plating or addition elements in the bath, the same effects are obtained, and the corrosion resistance subsequent to forming is stabilized.

TABLE 9

| No. | Amount of Ni preplating (g/m$^2$) | Addition element in plating (%) | Potential difference between steel and alloy layer (V) | Corrosion resistance after forming | Comprehensive evaluation | Note |
|---|---|---|---|---|---|---|
| 1 | 0.5 | — | 0.33 | ○ | ○ | E.I.* |
| 2 | 1.0 | — | 0.30 | ○ | ○ | E.I. |
| 3 | 1.0 | Zn: 1 | 0.27 | ○ | ○ | E.I. |
| 4 | — | Sn: 0.5 Zn: 1 | 0.33 | ○ | ○ | E.I. |
| 5 | — | Sb: 0.5 Zn: 2 | 0.29 | ○ | ○ | E.I. |

Note:
*: E.I. Example of invention
Comprehensive evaluation:
○: excellent
Δ: usable though deteriorated slightly
x: unusable

POSSIBILITY OF UTILIZATION IN THE INDUSTRY

The present invention provides a hot-dip Al-plated steel sheet having both corrosion resistance and press formability necessary for fuel tank materials of automobiles and also showing air-tightness in the weld zone which has been a problem to be solved. The plated steel sheet will become very useful as a new fuel tank material when the use of Pb type materials becomes difficult due to the environmental problems, and it will greatly contribute to the industry.

What is claimed is:

1. A fuel tank fabricated from an aluminum plated steel sheet excellent in air-tightness after welding and corrosion resistance subsequent to forming, said aluminum plated steel sheet comprising:
   an iron based steel sheet consisting of iron and, in terms of % by weight, up to 0.01% of C, up to 0.2% of Si, less than 0.6% of Mn, up to 0.04% of P, up to 0.1% of soluble Al, up to 0.01% of N,
   at least one of Ti and Nb in a total amount of at least the atomic equivalent of (C+N) and up to 0.2%, 0.0001 to 0.0030% of B, and at least one element selected from the group consisting of 0.05 to 0.5% of Cu, 0.05 to 0.5% of Ni, and 0.05 to 0.5% of Mo, and,
   an aluminum based plating layer on the surface of the steel sheet consisting essentially of aluminum and 2 to 13% of Si in terms of % by weight.

2. The fuel tank according to claim 1, wherein the amount of the Al plating layer is up to 50 g/m$^2$.

3. The fuel tank according to claim 1, wherein the aluminum plated steel sheet includes a chromate coating layer in an amount of 5 to 100 mg/m$^2$ as Cr on an outside side of the aluminum based plating layer.

4. The fuel tank according to claim 1, wherein the aluminum plated steel sheet comprises an organic resin coating layer on the top surface at least on one side thereof.

5. A fuel tank fabricated from an aluminum plated steel sheet excellent in air-tightness after welding and corrosion resistance subsequent to forming, said aluminum plated steel sheet comprising:
   an iron based steel sheet consisting of iron and, in terms of % by weight, up to 0.01% of C, up to 0.2% of Si, less than 0.6% of Mn, up to 0.04% of P, up to 0.1% of soluble Al, up to 0.01% of N, at least one or both of Ti and Nb in a total amount of at least the atomic equivalent of (C+N) and up to 0.2%, 0.0003 to 0.0030% of B, and at least one element selected from the group consisting of 0.05 to 0.5% of Cu, 0.05 to 0.5% of Ni, and 0.05 to 0.5% of Mo, and,
   an aluminum based plating layer on the surface of the steel sheet consisting essentially of aluminum and 2 to 13% of Si in terms of % by weight.

6. The fuel tank according to claim 5, wherein the amount of the Al plating layer is up to 50 g/m$^2$.

7. The fuel tank according to claim 5, wherein the aluminum plated steel sheet includes a chromate coating layer in an amount of 5 to 100 mg/m$^2$ as Cr on an outside side of the aluminum based plating layer.

8. The fuel tank according to claim 5, wherein the aluminum plated steel sheet comprises an organic resin coating layer on the top surface at least on one side thereof.

9. A fuel tank fabricated from an aluminum plated steel sheet excellent in air-tightness after welding and corrosion resistance subsequent to forming, said aluminum plated steel sheet comprising:
   an iron based steel sheet consisting of iron and, in terms of % by weight, up to 0.003% of C, up to 0.1% of Si, up to 0.4% of Mn, up to 0.02% of P, up to 0.1% of soluble Al, up to 0.01% of N, at least one of Ti and Nb in a total amount of at least the atomic equivalent of (C+N) and up to 0.2%, 0.0003 to 0.0030% of B, and at least one element selected from the group consisting of 0.05 to 0.5% of Cu, 0.05 to 0.5% of Ni, and 0.05 to 0.5% of Mo, and, an aluminum based plating layer on the surface of the steel sheet consisting essentially of aluminum and 2 to 13% of Si in terms of % by weight.

10. The fuel tank according to claim 9, wherein the amount of the Al plating lay r is up to 50 g/m$^2$.

11. The fuel tank according to claim 9, wherein the aluminum plated steel sheet includes a chromate coating layer in an amount of 5 to 100 mg/m$^2$ as Cr on an outside side of the aluminum based plating layer.

12. The fuel tank according to claim 9, wherein the aluminum plated steel sheet comprises an organic resin coating layer on the top surface at least on one side thereof.

13. A fuel tank fabricated from an aluminum plated steel sheet excellent in air-tightness after welding and corrosion resistance subsequent to forming, said aluminum plated steel sheet comprising:

an iron based steel sheet consisting of iron and, in terms of % by weight, up to 0.003% of C, up to 0.03% of Si, up to 0.3% of Mn, up to 0.02% of P, up to 0.006% of soluble N, and up to 0.1% of Ti, and, an aluminum based plating layer on the surface of the steel sheet consisting essentially of aluminum and 2 to 13% of Si in terms of % by weight, the steel sheet showing a total elongation of at least 45% after plating.

14. The fuel tank according to claim 13, wherein the amount of the Al plating layer is up to 50 g/m$^2$.

15. The fuel tank according to claim 13, wherein the aluminum plated steel sheet includes a chromate coating layer in an amount of 5 to 100 mg/m$^2$ as Cr on an outside side of the aluminum based plating layer.

16. The fuel tank according to claim 13, wherein the aluminum plated steel sheet comprises an organic resin coating layer on the top surface at least on one side thereof.

17. A fuel tank fabricated from an aluminum plated steel sheet excellent in air-tightness after welding and corrosion resistance subsequent to forming, said aluminum plated steel sheet comprising:

an iron based steel sheet consisting of iron and, in terms of % by weight, up to 0.003% of C, up to 0.03% of Si, up to 0.3% of Mn, up to 0.02% of P, up to 0.006% of soluble N, up to 0.1% of Ti, and at least one element selected from the group consisting of 0.05 to 0.5% of Cu, 0.05 to 0.5% of Ni, and 0.05 to 0.5% of Mo, and, an aluminum based plating layer on the surface of the steel sheet consisting essentially of aluminum and 2 to 13% of Si in terms of % by weight, the steel sheet showing a total elongation of at least 45% after plating.

18. A fuel tank fabricated from an aluminum plated steel sheet excellent in air-tightness after welding and corrosion resistance subsequent to forming;

said aluminum plated steel sheet comprising an iron based steel sheet consisting of iron and, in terms of % by weight, up to 0.01% of C, up to 0.2% of Si, less than 0.6% of Mn, up to 0.04% of P, up to 0.1% of soluble Al, up to 0.01% of N, at least one of Ti and Nb in a total amount of at least the atomic equivalent of (C+N) and up to 0.2%, 0.0001 to 0.0030% of B, and at least one element selected from the group consisting of 0.05 to 0.5% of Cu, 0.05 to 0.5% of Ni, and 0.05 to 0.5% of Mo;

an Al-Fe-Si intermetallic compound layer disposed on said steel sheet substrate and an aluminum based plating layer consisting essentially of Al and Si, and unavoidable impurities, disposed on the intermetallic compound layer, the difference between the immersion potential of the steel sheet substrate for plating and that of the intermetallic compound layer in a solution comprising 100 ppm of formic acid and the balance water and unavoidable impurities being up to 0.35 V.

19. The fuel tank according to claim 18, wherein the aluminum based plating layer consists essentially of aluminum, 2 to 13% of Si, and 0.5 to 5% in total of one or at least two elements selected from the group consisting of Sn, Zn, Sb and Bi.

20. The fuel tank according to claim 18, wherein the aluminum plated steel sheet includes a chromate coating layer in an amount of 5 to 100 mg/m$^2$ as Cr on an outside side of the aluminum based plating layer.

21. The fuel tank according to claim 18, wherein the aluminum plated steel sheet comprises an organic resin coating layer on the top surface at least on one side thereof.

* * * * *